US012570413B2

(12) United States Patent
Mukae

(10) Patent No.: US 12,570,413 B2
(45) Date of Patent: Mar. 10, 2026

(54) UNIFIED DATA LIBRARY, FLYING OBJECT COPING SYSTEM, FLYING PATH PREDICTION METHOD, AND COMMUNICATION ROUTE SEARCH METHOD FOR ACCURATELY PREDICTING A PATH OF A FLYING OBJECT

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 58 days.

(21) Appl. No.: 18/287,651

(22) PCT Filed: Apr. 26, 2022

(86) PCT No.: PCT/JP2022/018815
§ 371 (c)(1),
(2) Date: Oct. 20, 2023

(87) PCT Pub. No.: WO2022/249833
PCT Pub. Date: Dec. 1, 2022

(65) Prior Publication Data
US 2024/0359833 A1 Oct. 31, 2024

(30) Foreign Application Priority Data
May 27, 2021 (JP) ................................. 2021-089112

(51) Int. Cl.
*B64G 1/66* (2006.01)
*B64G 1/10* (2006.01)

(52) U.S. Cl.
CPC .................................... *B64G 1/66* (2013.01); *B64G 1/10* (2013.01)

(58) Field of Classification Search
CPC .................................... B64G 1/66; B64G 1/10
See application file for complete search history.

(56) References Cited

U.S. PATENT DOCUMENTS 10,250,336 B1 * 4/2019 Palmer ................... H04B 10/85
2010/0038490 A1 * 2/2010 Hofschuster ............. B64G 3/00
                                                          244/158.1

(Continued)

FOREIGN PATENT DOCUMENTS

JP          2008-137439 A        6/2008

OTHER PUBLICATIONS

International Search Report and Written Opinion mailed on Jul. 26, 2022, received for PCT Application PCT/JP2022/018815, filed on Apr. 26, 2022, 8 pages including English Translation.

(Continued)

*Primary Examiner* — Keith D Bloomquist
(74) *Attorney, Agent, or Firm* — XSENSUS LLP

(57) ABSTRACT

A unified data library is referred to by a surveillance satellite group to track a flying object, a surveillance ground facility to control the surveillance satellite group, a communication satellite group to transfer flying object information acquired by the surveillance satellite group, a communication ground facility to control the communication satellite group, a coping asset to cope with the flying object, and a coping ground facility to control the coping asset. The unified data library includes a database having stored therein orbit information of the surveillance satellite group, orbit information of the communication satellite group, position information of the coping asset, and a plurality of flying path models having flying paths of the flying object modeled therein.

14 Claims, 10 Drawing Sheets

1000:FLYING OBJECT COPING SYSTEM 110
111
110
111
110G 130
130
130G

10

710:EARTH

120
SURVEILLANCE GROUND FACILITY

10

140
COMMUNICATION GROUND FACILITY

160
COPING GROUND FACILITY

300
UNIFIED DATA LIBRARY

DATABASE 310

COPING ASSET 150

(56)                    References Cited

U.S. PATENT DOCUMENTS

| | | | | |
|---|---|---|---|---|
| 2011/0262008 A1* | 10/2011 | Holicki | .................... | F41G 3/02 |
| | | | | 382/103 |
| 2012/0316819 A1* | 12/2012 | Martell | .................. | F41H 11/02 |
| | | | | 702/94 |
| 2019/0359330 A1* | 11/2019 | Zhao | ........................ | B64D 1/06 |
| 2022/0065587 A1* | 3/2022 | Koblick | ................. | G01S 13/72 |
| 2023/0031823 A1* | 2/2023 | Mukae | .................... | B64G 3/00 |

OTHER PUBLICATIONS

Theresa Hitchens, "Air Force Hires Startup to Build Up MDO's Unified Data Library", Available Online at: https://breakingdefense.com/2019/10/air-force-hires-startup-to-build-up-mdos-unified-data-library/, Oct. 31, 2019, 4 pages.
Theresa Hitchens, "Exclusive: Space Is at Heart of JADC2, Says Maj. Gen. Crider", Available Online at: https://breakingdefense.com/2020/12/exclusive-space-is-at-heart-of-jadc2-says-maj-gen-crider/, Dec. 23, 2020, 6 pages.

* cited by examiner

1000:FLYING OBJECT COPING SYSTEM

UNIFIED DATA LIBRARY, FLYING OBJECT COPING SYSTEM, FLYING PATH PREDICTION METHOD, AND COMMUNICATION ROUTE SEARCH METHOD FOR ACCURATELY PREDICTING A PATH OF A FLYING OBJECT

CROSS-REFERENCE TO RELATED APPLICATIONS

This application is based on PCT filing PCT/JP2022/018815, filed Apr. 26, 2022, which claims priority from Japanese Patent Application No. 2021-089112, filed May 27, 2021, the entire contents of each are incorporated herein by reference.

TECHNICAL FIELD

The present disclosure relates to a unified data library, a fling object coping system, a flying path prediction method, and a communication route search method.

BACKGROUND ART

There is a technique of conducting exhaustive surveillance of an area at a specific latitude on the entire spherical surface of the earth by using a satellite constellation (for example, Patent Literature 1).

Also, as for a flying object in a ballistic orbit, there is a technique of predicting a path of the flying object by using a flying path model. Regarding this, in recent years, with the emergence of flying objects repeating intermittent injection called glide bombs, variations of flying path models increase, compared with flying objects in ballistic orbits. Also, the glide bombs have a problem of a possibility of deviation from the flying path models due to intermittent injection.

CITATION LIST

Patent Literature

Patent Literature 1: JP 2008-137439

SUMMARY OF INVENTION

Technical Problem

An object of the present disclosure is to provide a flying path prediction method of accurately predicting a flying path of a glide bomb.

Solution to Problem

A unified data library according to the present disclosure is as follows.

The unified data library to be referred to by a surveillance satellite group formed of a plurality of surveillance satellites each including an infrared surveillance device to detect a launch of a flying object as launch detection information by using the infrared surveillance device and to track the flying object, a surveillance ground facility to operate and control the surveillance satellite group, a communication satellite group formed of a plurality of communication satellites to transfer flying object information acquired by the surveillance satellite group as satellite information, a communication ground facility to operate and control the communication satellite group, a coping asset to cope with the flying object, and a coping ground facility to operate and control the coping asset, the unified data library comprising a database having stored therein orbit information of the surveillance satellite group, orbit information of the communication satellite group, position information of the coping asset, and a plurality of flying path models having flying paths modeled therein, the flying paths configured by using launch position coordinates, a flying direction, a time-series flying distance from a launch to an impact, and a flying altitude profile of the flying object.

Advantageous Effects of Invention

According to the present disclosure, a flying path prediction method of accurately predicting a flying path of a glide bomb can be provided.

DESCRIPTION OF EMBODIMENTS

Figure 1:
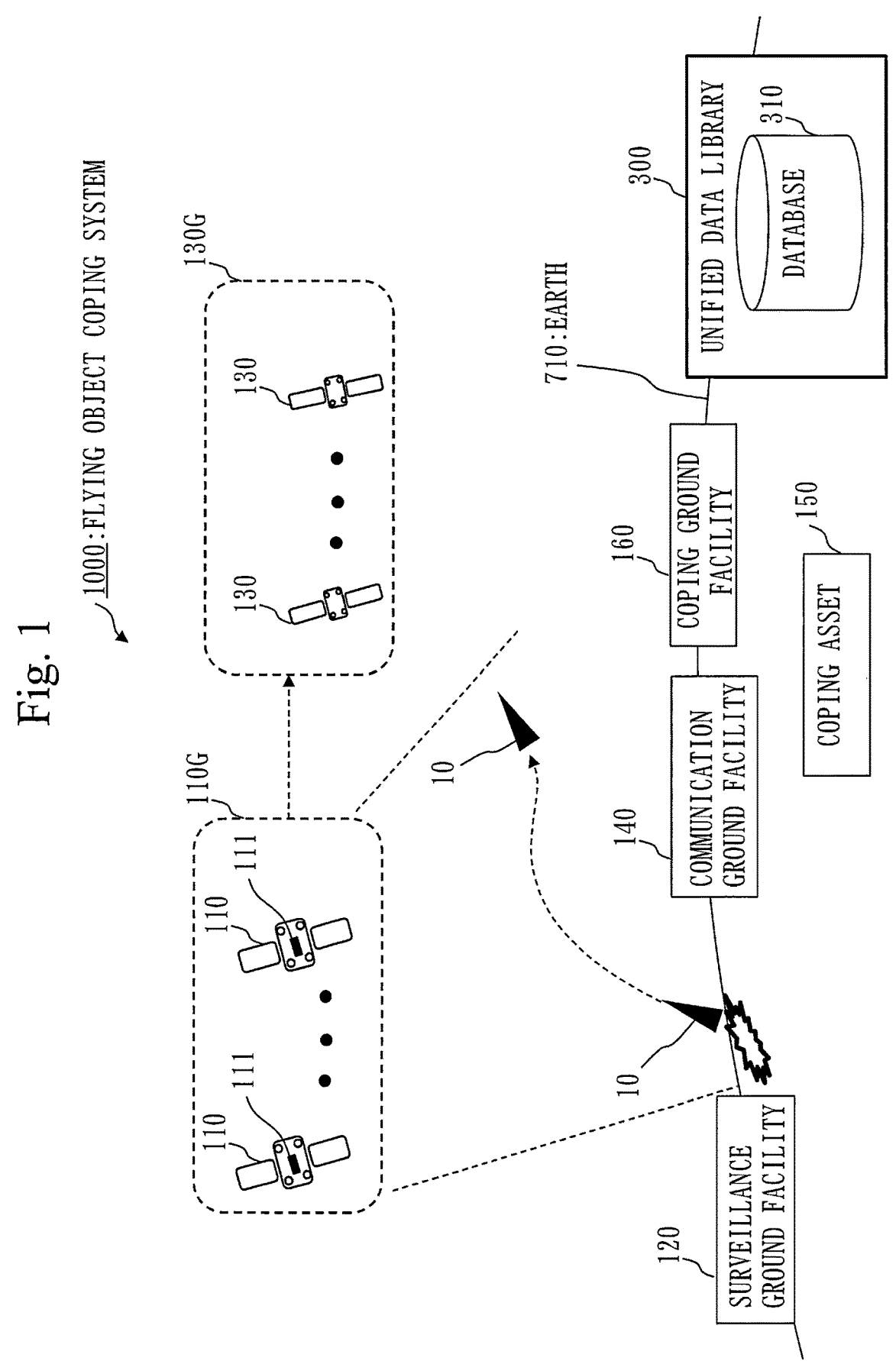
FIG. 1 is a diagram of Embodiment 1, illustrating a flying object coping system 1000.

In description of embodiments and the drawings, identical components and corresponding components are provided with the same reference character.

Description of components provided with the same reference character is omitted or simplified as appropriate. In the following embodiments, a "unit" may be read as a "circuit", "step", "procedure", "process", or "circuitry" as appropriate.

Embodiment 1

\*\*\*Description of Structure\*\*\*

FIG. 1 illustrates a flying object coping system 1000.

<Unified Data Library 300>

A unified data library 300 is a library to be referred to by a surveillance satellite group 110G, a surveillance ground facility 120, a communication satellite group 130G, a communication ground facility 140, a coping asset 150, and a coping ground facility 160. The unified data library 300 is a database device arranged on the earth 710, and is a computer.

(1) The surveillance satellite group 110G is formed of a plurality of surveillance satellites 110 each including an infrared surveillance device 111 to detect a launch of a flying object 10 as launch detection information by using the infrared surveillance device 111 and track the flying object 10.

(2) The surveillance ground facility 120 operates and controls the surveillance satellite group 110G.

(3) The communication satellite group 130G is formed of a plurality of communication satellites 130 to transfer flying object information acquired by the surveillance satellite group 110G as satellite information.

(4) The communication ground facility 140 operates and controls the communication satellite group 130G.

(5) The coping asset 150 copes with the flying object 10.

(6) The coping ground facility 160 operates and controls the coping asset 150.

The unified data library 300 includes a database 310. The database 310 is software.

Figure 2:
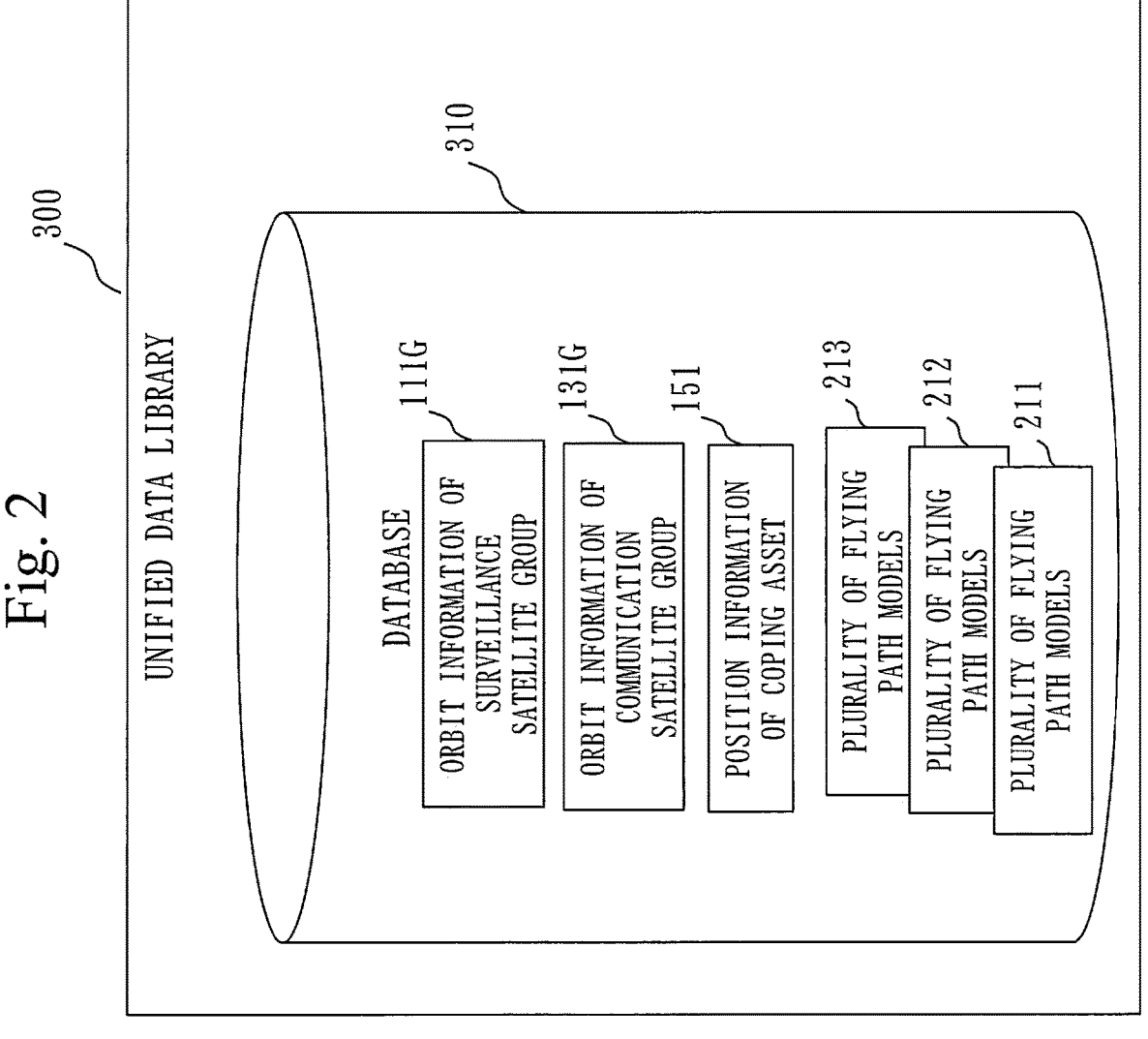
FIG. 2 is a diagram of Embodiment 1, illustrating information a database 310 has.

FIG. 2 illustrates information the database 310 has.

The database 310 has stored therein orbit information 111G of the surveillance satellite group 110G, orbit information 131G of the communication satellite group 130G, position information 151 of the coping asset 150, and a plurality of flying path models 211, 212, and 213 having flying paths modeled therein, the flying paths configured by using "launch position coordinates, a flying direction, a time-series flying distance from a launch to an impact, and a flying altitude profile" of a flying object 10.

<Server 320>

Figure 3:
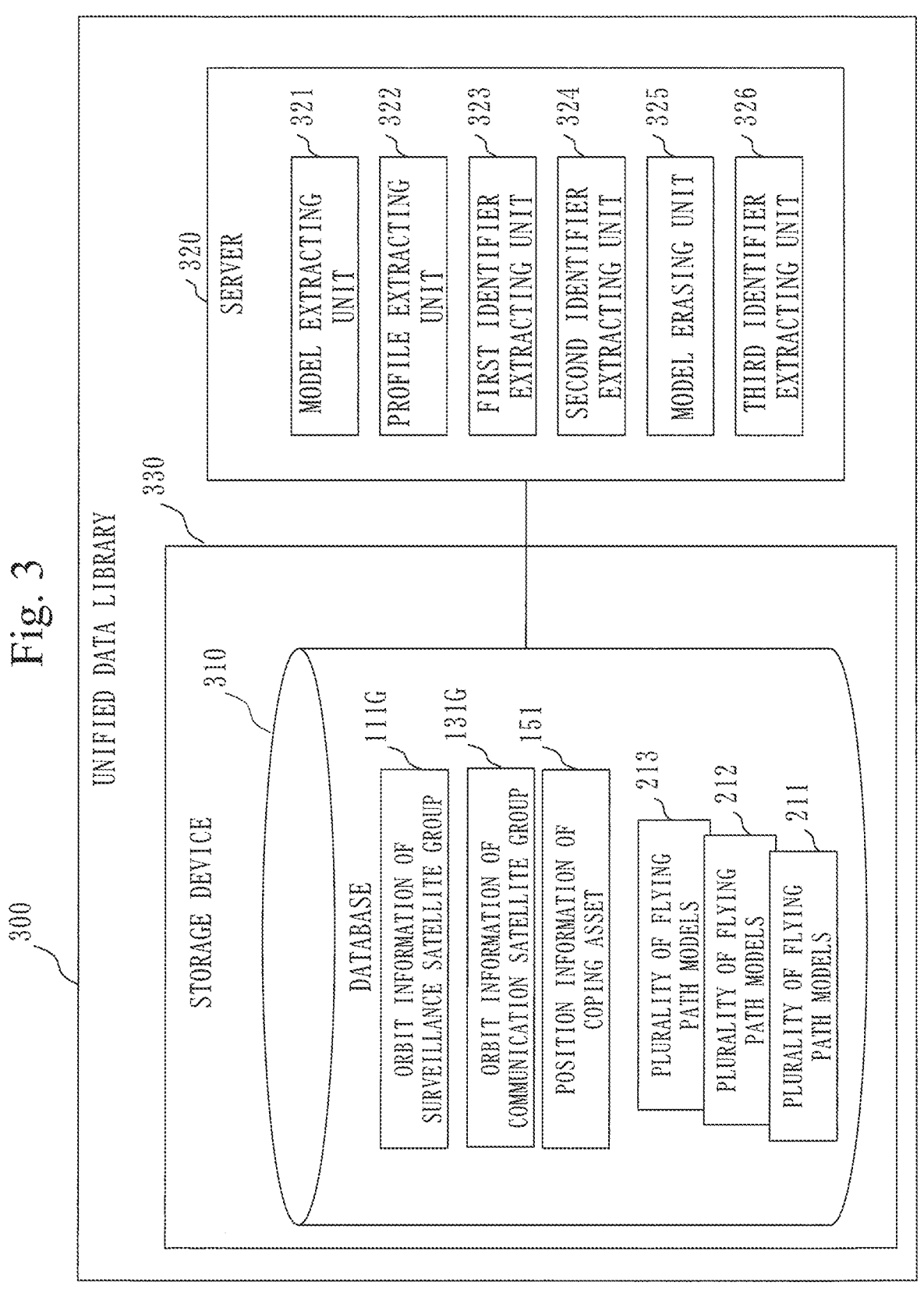
FIG. 3 is a diagram of Embodiment 1, illustrating a device structure of a unified data library 300.

FIG. 3 illustrates a device structure of the unified data library 300. The unified data library 300 includes a server 320 and a storage device 330. The database 310 is stored in the storage device 330. Note that the location of the database 310 is not limited. The database 310 may be in the storage device 330 as in FIG. 3, may be in the server 320, or on the cloud. The server 320 causes a search of the database 310 and a display of the search result and other information. The search result is an example of extracted information. A display device of the server 320 is not illustrated in the drawing.

The server 320 includes a model extracting unit 321, a profile extracting unit 322, a first identifier extracting unit 323, a second identifier extracting unit 324, a model erasing unit 325, and a third identifier extracting unit 326.

(1) The model extracting unit 321 uses, as a search condition, launch detection information of the flying object 10 detected by the infrared surveillance device 111 with which the surveillance satellite 110 is equipped. The model extracting unit 321 takes the launch detection information as a search condition, and extracts, from among the plurality of flying path models 211, 212, 213, . . . stored in the database 310, a flying path model having launch position coordinates conforming to a launch position indicated by the launch detection information.

(2) The profile extracting unit 322 takes a launch detection time of the flying object 10 detected by the infrared surveillance device 111 as a starting point, and extracts a correlation between a time in the extracted flying path model and the position coordinates of the flying object 10 as a flying profile.

(3) The first identifier extracting unit 323 extracts, from the database 310, a surveillance satellite ID of each of the plurality of surveillance satellites 110 flying at a position where the position coordinates of the flying object 10 with a time transition in the extracted flying profile can be surveyed, together with time information.

(4) The second identifier extracting unit 324 extracts, from the database 310, a communication satellite ID of the communication satellite 130 flying at a position where flying object information indicating information of the flying object 10 to be detected by the surveillance satellite 110 the surveillance satellite ID of which has been extracted can be transmitted and received, together with time information.

(5) The model erasing unit 325 erases a nonconforming flying path model from among the plurality of flying path models based on the flying object information acquired by the subsequent surveillance satellite 110 in accordance with the time transition.

(6) The third identifier extracting unit 326 extracts, from the database 310, a coping asset ID of the coping asset 150 arranged near the position coordinates of the flying profile.

<Satellite Unified Command Center 510>

Figure 4:
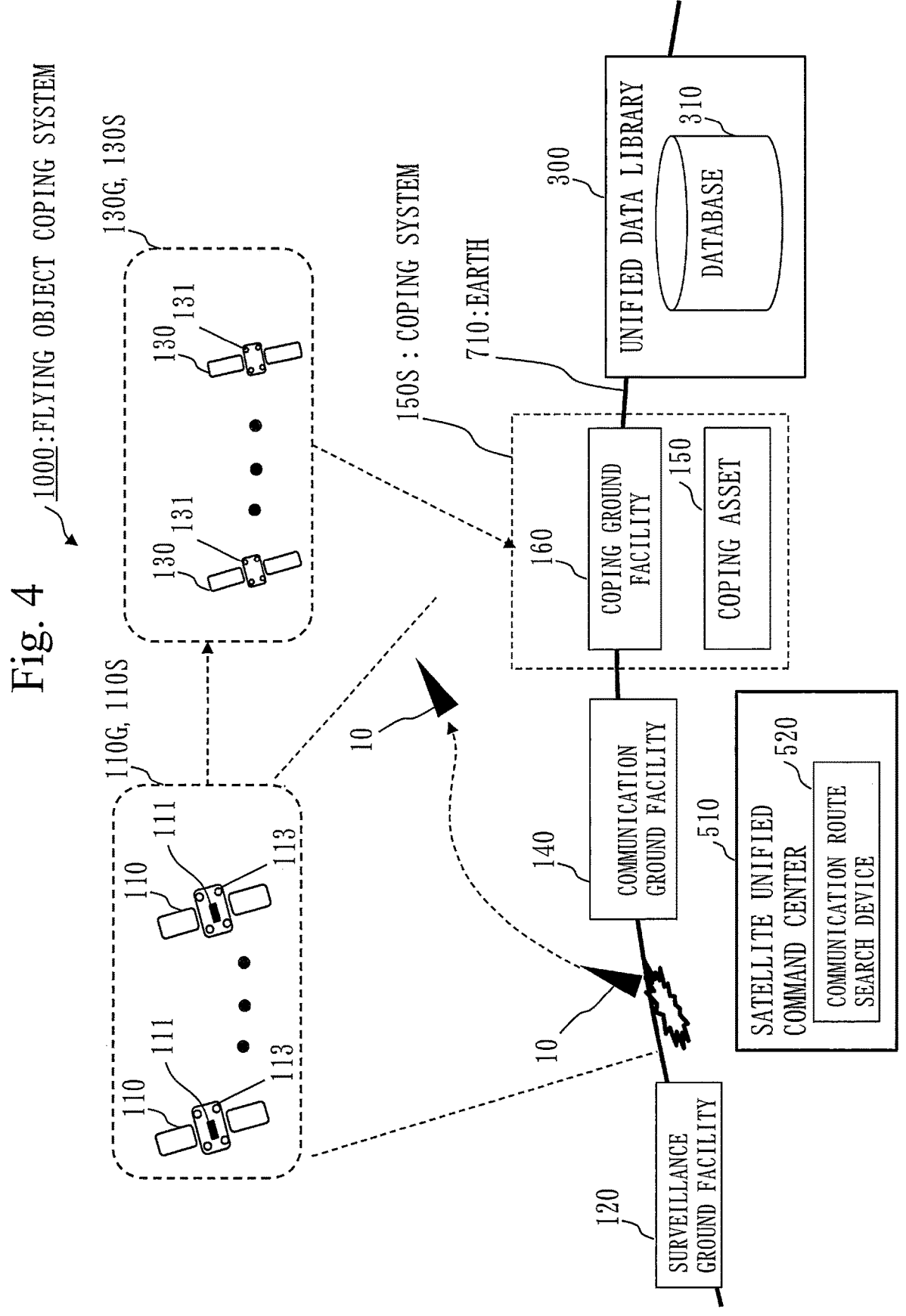
FIG. 4 is a diagram of Embodiment 1, illustrating a structure in which the flying object coping system 1000 includes a satellite unified command center 510.

FIG. 4 illustrates a structure in which the flying object coping system 1000 includes a satellite unified command center 510. The flying object coping system 1000 includes a surveillance system 110S, a satellite information transfer system 130S, and a coping system 150S. The surveillance system 110S has the surveillance satellite group 110G formed of the plurality of surveillance satellites 110 each including the infrared surveillance device 111 as a surveillance device and a communication device 113. The satellite information transfer system 130S has the communication satellite group 130G formed of the plurality of communication satellites 130 each including a communication device 131. The coping system 150S includes a coping asset 150 on land, at sea, and in the air to cope with the flying object 10. In the flying object coping system 1000 of FIG. 4, the surveillance system 110S transfers flying object information generated by surveying the flying object 10 via the satellite information transfer system 130S to the coping system 150S. The flying object coping system 1000 has the satellite unified command center 510 including a communication route search device 520 which searches for a communication route indicating a path of the satellite information transferred by any of the surveillance satellites 110 or any of the communication satellites 130. The communication route search device 520 searches for a communication route with reference to the unified data library 300. From the search result of the communication route search device 520, the satellite unified command center 510 transmits a directive command to the surveillance satellites 110 the surveillance system 110S has and the communication satellites 130 the satellite information transfer system 130S has.

Figure 5:
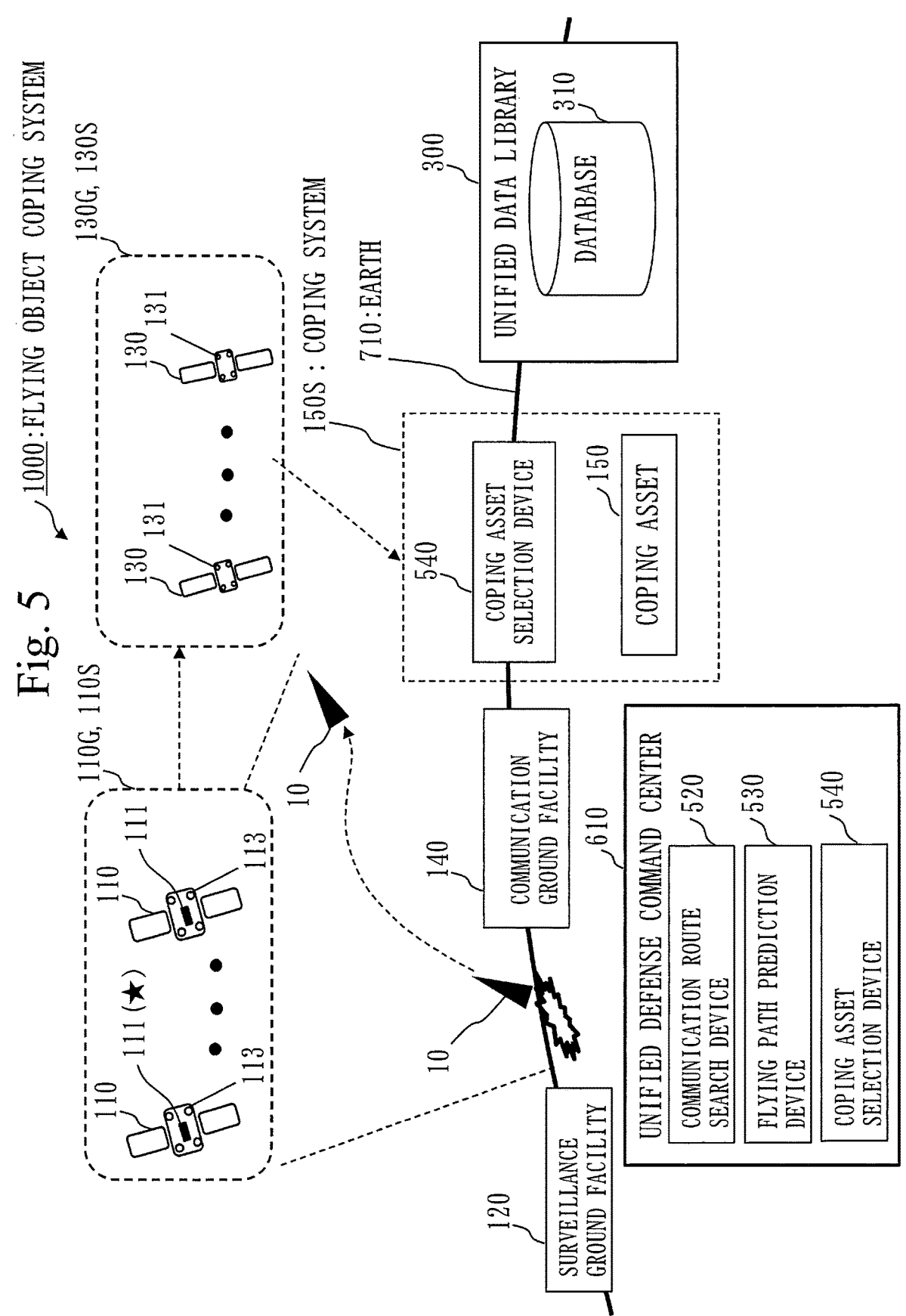
FIG. 5 is a diagram of Embodiment 1, illustrating a structure in which the flying object coping system 1000 includes a unified defense command center 610.

FIG. 5 illustrates a structure in which the flying object coping system 1000 includes a unified defense command center 610 and the unified defense command center 610 has the communication route search device 520, a flying path prediction device 530, and a coping asset selection device 540. The communication route search device 520 searches for a communication route indicating a path of the satellite information transferred by a surveillance satellite or a communication satellite. The flying path prediction device 530 predicts a flying direction of the flying object 10. The coping asset selection device 540 selects a coping asset 150. The communication route search device 520 searches for a communication route with reference to the unified data library 300. The flying path prediction device 530 predicts a flying direction of the flying object 10 with reference to the unified data library 300. The coping asset selection device 540 selects a coping asset 150 with reference to the unified data library 300. The unified defense command center 610 transmits a directive command from the reference results of the unified data library 300 by each device of the communication route search device 520, the flying path prediction device 530, and the coping asset selection device 540.

The unified defense command center 610 transmits a directive command to the surveillance satellites 110 the surveillance system 110S has, the communication satellites 130 the satellite information transfer system 130S has, and the coping asset 150.

Figure 6:
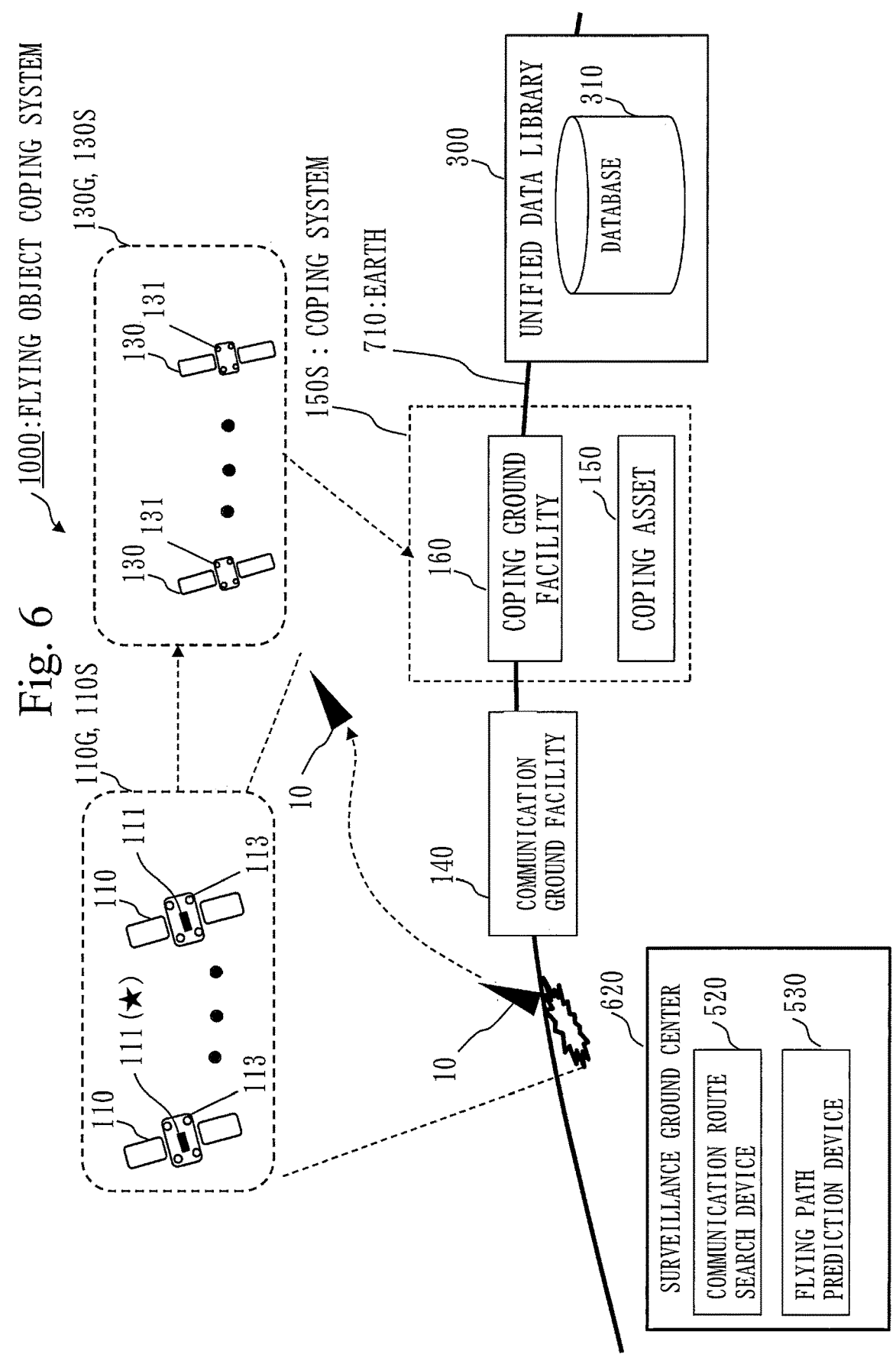
FIG. 6 is a diagram of Embodiment 1, illustrating a structure in which the flying object coping system 1000 includes a surveillance ground center 620.

FIG. 6 illustrates a structure in which the flying object coping system 1000 includes a surveillance ground center 620 and the surveillance ground center 620 has the communication route search device 520 and the flying path prediction device 530. The surveillance system 110S includes the surveillance satellite group 110G formed of the plurality of surveillance satellites 110 each including the infrared surveillance device 111 and the communication device 113, and the surveillance ground center 620 which transmits a directive command to the surveillance satellite group 110G. As with the communication ground facility 140, the surveillance ground center 620 controls the communication satellite group 130G. The surveillance ground center 620 includes the communication route search device 520 and the flying path prediction device 530. The communication route search device 520 searches for a communication route with reference to the unified data library 300. The flying path prediction device 530 predicts a flying direction of the flying object 10 with reference to the unified data library 300. The surveillance ground center 620 transmits a directive command from the reference results of the unified data library 300 by the communication route search device 520 and the flying path prediction device 530 to the communication satellite group 130G the satellite information transfer system 130S has.

Figure 7:
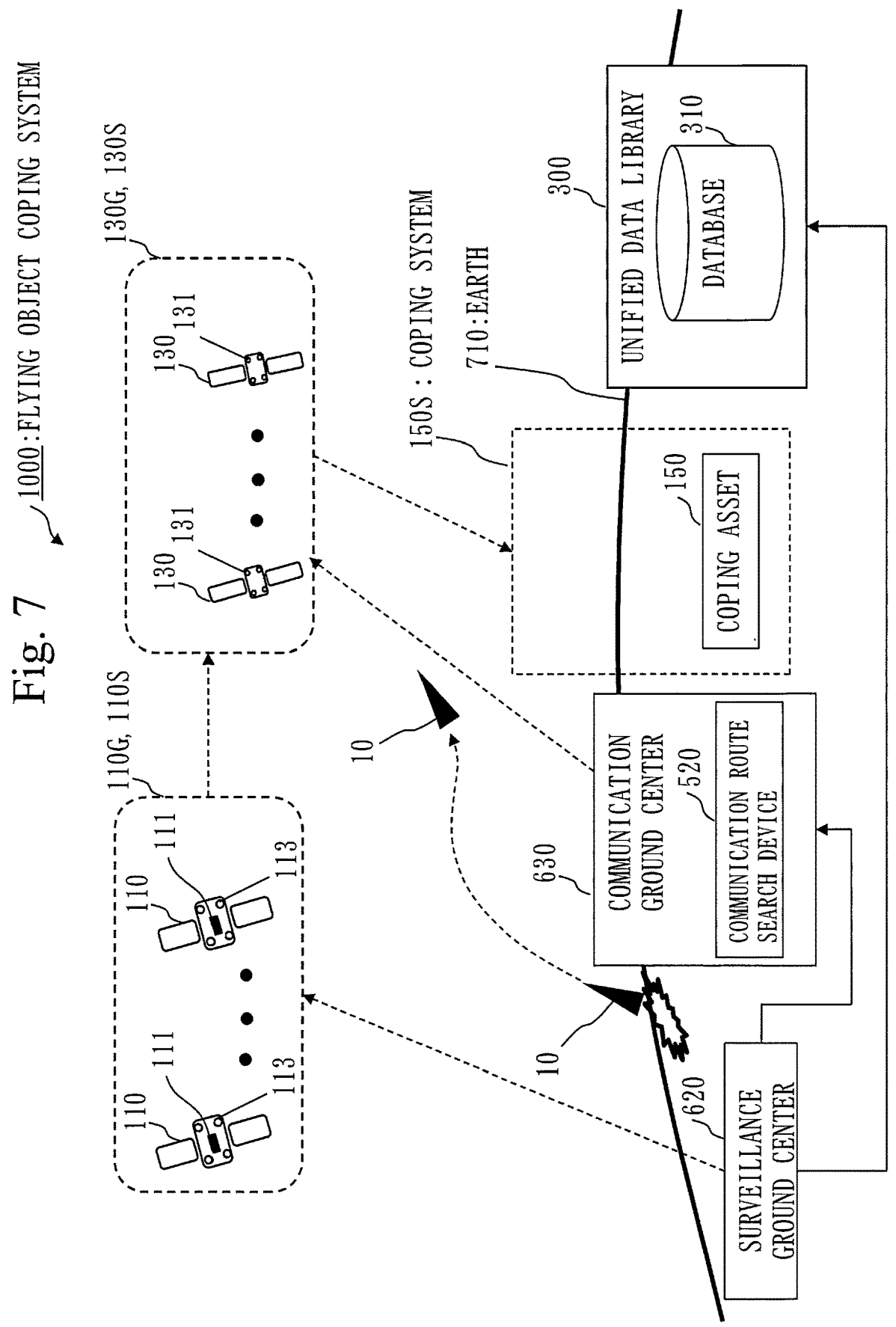
FIG. 7 is a diagram of Embodiment 1, illustrating a structure in which the flying object coping system 1000 includes the surveillance ground center 620 and a communication ground center 630.

In FIG. 7, the flying object coping system 1000 includes the surveillance ground center 620 and a communication ground center 630, and the communication ground center 630 has the communication route search device 520. The flying object coping system 1000 of FIG. 7 includes the surveillance system 110S, the satellite information transfer system 130S, and the coping system 150S. The surveillance system 110S includes the surveillance satellite group 110G formed of the plurality of surveillance satellites 110 each including the infrared surveillance device 111 as a surveillance device and the communication device 113, and the surveillance ground center 620 which transmits a directive command to the surveillance satellite group 110G. The satellite information transfer system 130S has the communication satellite group 130G formed of the plurality of communication satellites 130 each including the communication device 131, and a communication ground center 630 which transmits a directive command to the communication satellite group 130G. The coping system 150S includes the coping asset 150 on land, at sea, and in the air to cope with the flying object 10. The flying object coping system 1000 transfers flying object information generated by the surveillance system 110S surveying the flying object 10 via the satellite information transfer system 130S to the coping system 150S. The surveillance ground center 620 refers to the unified data library 300 and transmits, to the communication ground center 630, a surveillance satellite ID, time, and position information of the surveillance satellite 110 which transmits the flying object information, a surveillance satellite ID, time, and position information of the surveillance satellite 110 on a reception side receiving the flying object information, or position information of the coping system 150S. The surveillance ground center 620 is an example of a surveillance ground system. The communication ground center 630 includes the communication route search device 520 to search for a communication route indicating a path of satellite information transferred by the surveillance satellite 110 or the communication satellite 130. As the search result of the communication route searched for by the communication route search device 520, the communication ground center 630 transmits a directive command to the communication satellite group 130G the satellite information transfer system 130S has.

Figure 8:
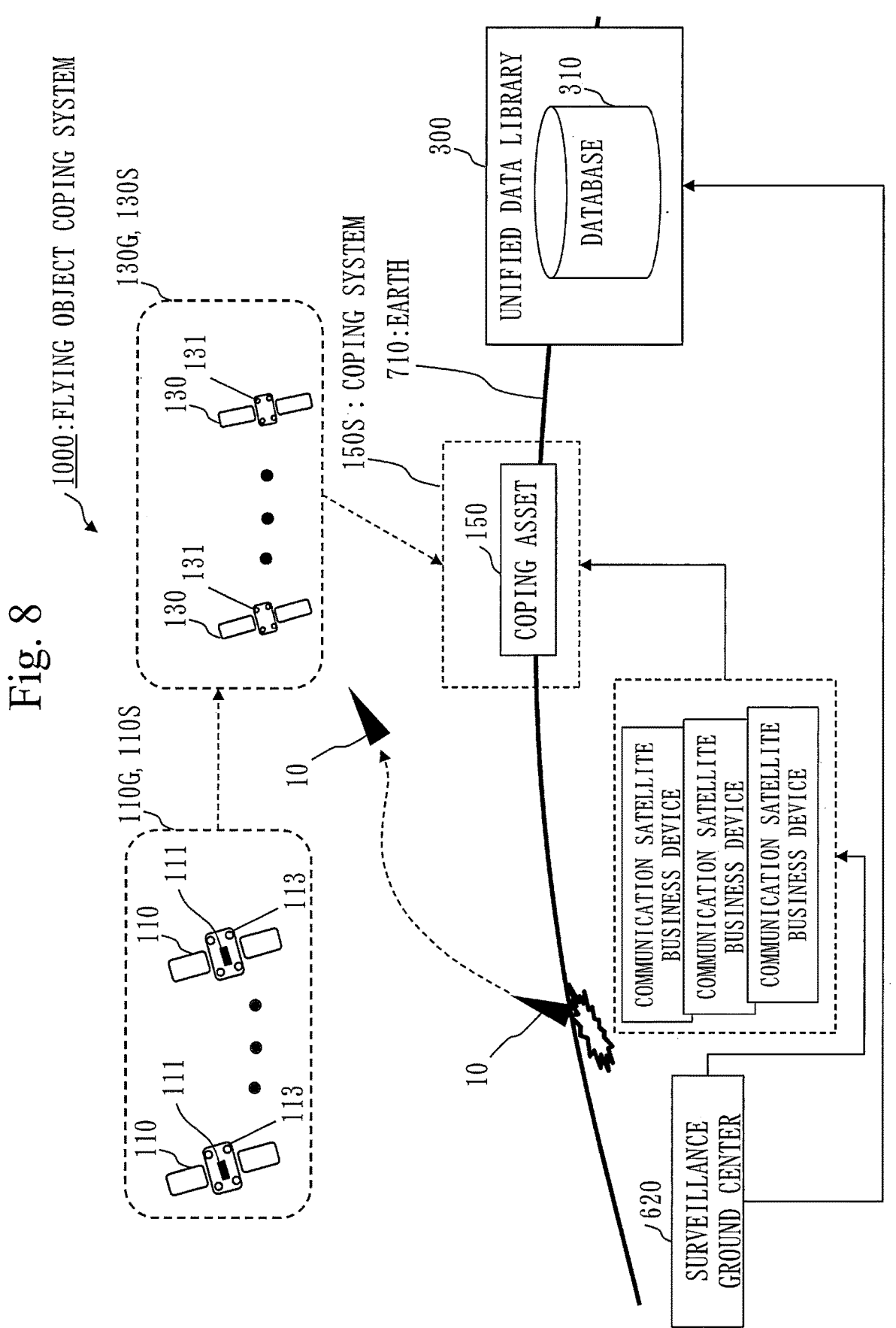
FIG. 8 is a diagram of Embodiment 1, illustrating a structure in which the flying object coping system 1000 includes a plurality of communication satellite business devices.

FIG. 8 illustrates a structure in which the flying object coping system 1000 includes a plurality of communication satellite business devices. The flying object coping system 1000 includes the surveillance system 110S, the satellite information transfer system 130S, and the coping system 150S. In the flying object coping system 1000, the surveillance system 110S transfers flying object information generated by surveying the flying object 10 via the satellite information transfer system 130S to the coping system 150S. The communication satellite group 130G is operated and controlled by the plurality of communication satellite business devices. With reference to the unified data library 300, the surveillance ground center 620 of the surveillance system 110S transfers the flying object information acquired by the surveillance satellite 110 via the plurality of communication satellite business devices to the coping system 150S.

In Embodiment 1, as a method to be performed by the flying path prediction device 530 and the communication route search device 520, the following flying path prediction method and communication route search method can be performed.

(Flying Path Prediction Method)

The flying path prediction method analyzes, at the ground system, flying object surveillance information acquired by a satellite constellation configured of the plurality of surveillance satellites 110 each including the infrared surveillance device 111, and predicts a flying path of the flying object 10.

This flying path prediction method takes flying object launch detection information detected by the infrared surveillance device 111 as a starting point, analyzes an elapsed time after launch detection, a flying distance, and a flying altitude measured by the infrared surveillance device 111 included in a subsequent machine, and excludes a nonconforming flying path model even in consideration of a measurement error from among the plurality of flying path models stored in the database 310 included in the unified data library 300, repeats an act of excluding a nonconforming flying path model based on measurement information of a next subsequent machine, takes one or plurality of finally-remaining flying path models as provisional flying path prediction models, and based on measurement information of subsequent machines, corrects a deviation amount from the provisional flying path prediction models to predict a flying path to the impact of the flying object.

(Communication Route Search Method)

This communication route search method is a communication route search method in the following flying object coping system.

The flying object coping system transfers flying object surveillance information acquired by a surveillance satellite constellation configured of a plurality of surveillance satellites each including an infrared surveillance device, to another surveillance satellite and a coping asset by taking, as a transfer path, a communication satellite constellation in which a plurality of communication satellites fly on a plurality of orbital planes and the communication satellites crosslink with each other to form a communication network, and copes with the flying object by the coping asset before the impact of the flying object.

In this communication route search method, the ground system searches for a shortest communication route among communication routes of the communication satellite group.

In this communication route search method, the ground system includes a communication route search device to analyze communication satellite IDs configuring a communication path for transferring flying object information from a surveillance satellite to another surveillance satellite in a shortest route, a sequence of communication satellite IDs via which passage is made in a time-series manner, and times when communication satellites communicate with each other.

The ground system refers to the unified data library 300, takes flying object launch detection information detected by the infrared surveillance device as a starting point, selects a subsequent surveillance satellite which can survey a flying path at a predicted time from among a plurality of flying path models, conducts a search for a shortest route for transferring information from a launch-detecting surveillance satellite to a subsequent surveillance satellite, based on flying object information detected by a further subsequent surveillance satellite, selects a next subsequent surveillance satellite which can survey a flying path at a predicted time by using a flying path model as a candidate and conducts a search for a shortest route for transferring information from the subsequent surveillance satellite to the next subsequent surveillance satellite, and after repeating, based on the result of a flying path prediction separately conducted by the ground system, a search for a shortest route for transferring information to a surveillance satellite which can survey with regard to a flying path and a passage time, searches for a shortest route for transferring information to a coping asset capable of coping.

Effects of Embodiment 1

According to Embodiment 1 described above, it is possible to provide a flying path prediction method of accurately predicting a flying path of a glide bomb by referring to the unified data library 300 from the plurality of devices.

(Supplement to Hardware Structure of Artificial Satellite 400)

Figure 9:
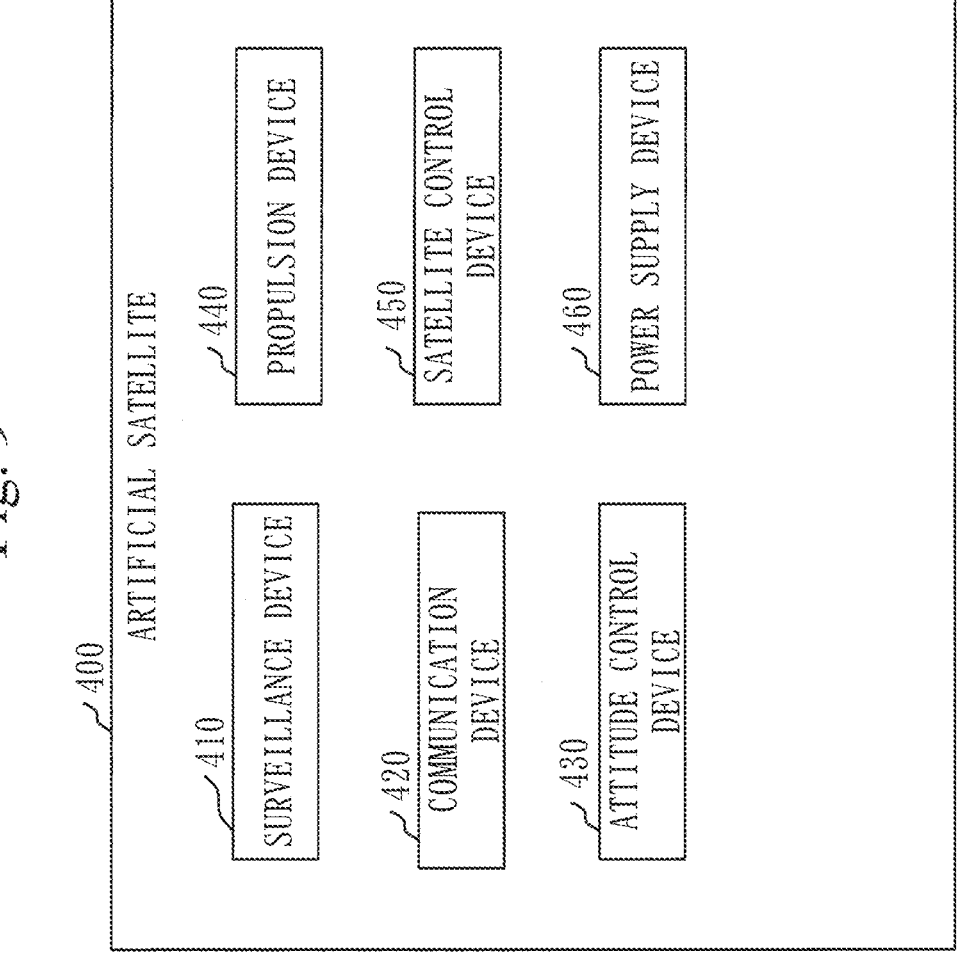
FIG. 9 is a diagram of Embodiment 1, illustrating a hardware structure of an artificial satellite 400.

FIG. 9 illustrates a hardware structure of an artificial satellite 400. With reference to FIG. 9, the hardware structure of the artificial satellite 400 is described. The artificial satellite 400 is the surveillance satellite 110 or the communication satellite 130.

Based on FIG. 9, the structure of the artificial satellite 400 is described. The artificial satellite 400 includes a surveillance device 410, a communication device 420, an attitude control device 430, a propulsion device 440, a satellite control device 450, and a power supply device 460.

The surveillance device 410 is not required when the artificial satellite 400 is a communication satellite without requiring a surveillance function. The communication device 420 is required even when the artificial satellite 400 is a surveillance satellite.

The attitude control device 430 is a device for controlling attitude elements such as the attitude of the artificial satellite 400 and the angular velocity of the artificial satellite 400. The attitude control device 430 changes each attitude element to a desired direction. Alternatively, the attitude control device 430 maintains each attitude element in a desired direction. The attitude control device 430 includes an attitude sensor, an actuator, and a controller. The attitude sensor can be a gyroscope, an earth sensor, a solar sensor, a star tracker, a thruster, a magnetic sensor, and the like. The actuator can be an attitude control thruster, a momentum wheel, a reaction wheel, a control moment gyro, and the like. The controller controls the actuator by following measurement data of the attitude sensor or various commands from the ground facility and the ground center.

The propulsion device 440 is a device which provides propulsion to the artificial satellite 400, and changes the speed of the artificial satellite 400. Specifically, the propulsion device 440 is an electrical propulsor. For example, the propulsion device 440 can be an ion engine or a hall thruster.

The satellite control device 450 is a computer which controls each device of the artificial satellite 400, and includes a processing circuit. For example, the satellite control device 450 controls each device by following various commands transmitted from the ground facility.

The power supply device 460 includes a solar cell, a battery, a power control device, and the like, and supplies electric power to each device of the artificial satellite 400.

The processing circuit included in the satellite control device 450 is described. The processing circuit may be dedicated hardware or a processor which executes a program stored in memory. In the processing circuit, part of the functions may be implemented by dedicated hardware and the remaining functions may be implemented by software or firmware. That is, the processing circuit can be implemented by hardware, software, firmware, or a combination of these. The dedicated hardware is, specifically, a single circuit, composite circuit, programmed processor, parallel-programmed processor, ASIC, FPGA, or a combination of these. ASIC is an abbreviation of Application Specific Integrated Circuit. FPGA is an abbreviation of Field Programmable Gate Array.

(Supplement to Hardware Structure of Ground Device)

Figure 10:
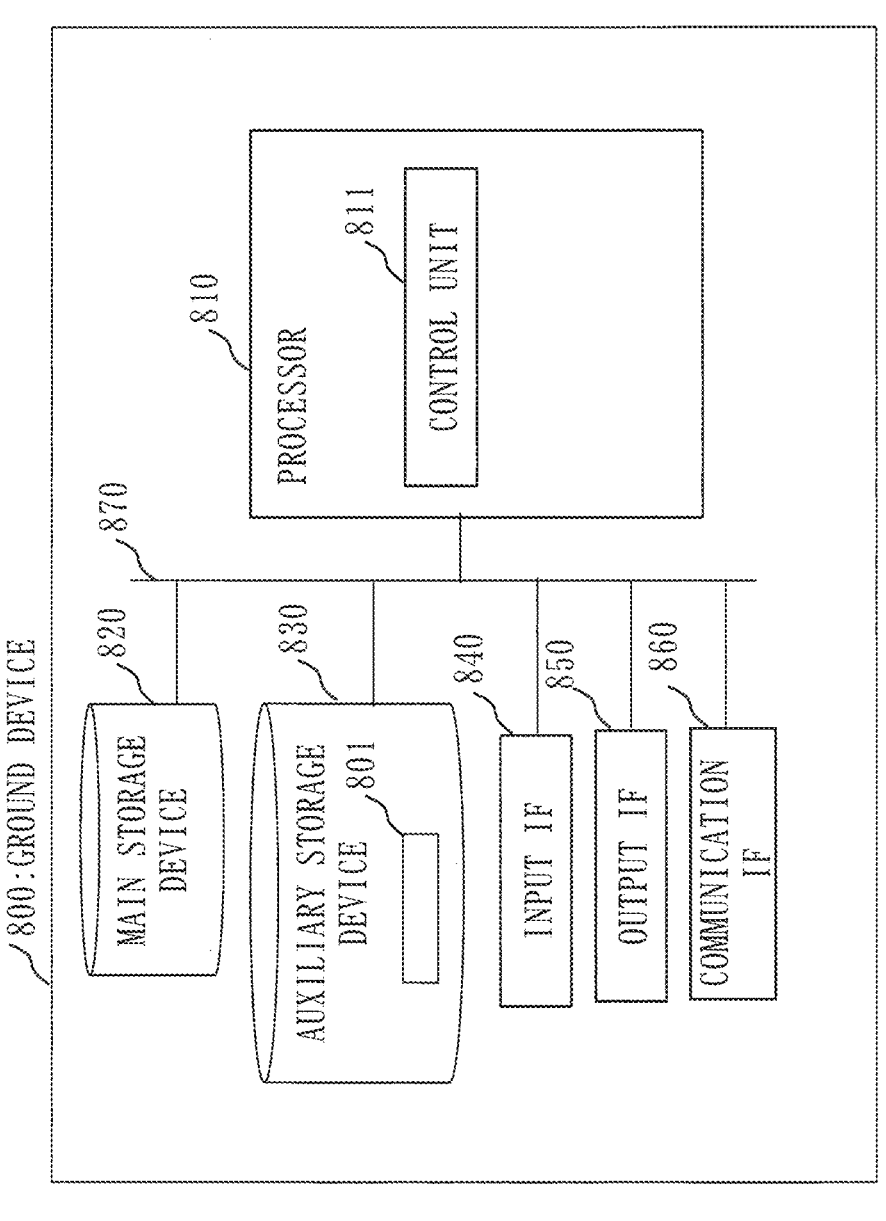
FIG. 10 is a diagram of Embodiment 1, illustrating a hardware structure of a ground device 800.

FIG. 10 illustrates a hardware structure of a ground device 800. The ground device is a device arranged on the earth, meaning a device such as a ground facility, a ground center or the communication route search device 520 included therein, or the like. With reference to FIG. 10, the hardware structure of the ground device 800 is described. The ground device 800 is a computer. The ground device 800 includes a processor 810 and other pieces of hardware such as a main storage device 820, an auxiliary storage device 830, an input IF 840, an output IF 850, and a communication IF 860. IF denotes an interface. The processor 810 is connected to the other pieces of hardware via a signal line 870 to control these other pieces of hardware. The ground device 800 includes a control unit 811 as a functional component. The control unit 811 performs process of the ground device 800. The functions of the control unit 811 are implemented in cooperation with the processor 810 and a program 801.

The program 801 is a program which causes the computer to execute each process, each procedure, or each step obtained by reading the "unit" of the control unit 811 as "process", "procedure", or "step". The program 801 may be provided as being stored in a computer-readable recording medium or may be provided as a program product.

REFERENCE SIGNS LIST

10: flying object; 110S: surveillance system; 110G: surveillance satellite group; 111G: orbit information; 110: surveillance satellite; 111: infrared surveillance device; 113: communication device; 120: surveillance ground facility; 130G: communication satellite group; 130S: satellite information transfer system; 131G: orbit information; 130: communication satellite; 131: communication device; 140: communication ground facility; 150S: coping system; 150: coping asset; 151: position information; 160: coping ground facility; 211: flying path model; 300: unified data library; 310: database; 320: server; 321: model extracting unit; 322: profile extracting unit; 323: first identifier extracting unit; 324: second identifier extracting unit; 325: model erasing unit; 326: third identifier extracting unit; 330: storage device; 400: artificial satellite; 410: surveillance device; 420: communication device; 430: attitude control device; 440: propulsion device; 450: satellite control device; 460: power supply device; 510: satellite unified command center; 520: communication route search device; 530: flying path prediction device; 540: coping asset selection device; 610: unified defense command center; 620: surveillance ground center; 630: communication ground center; 710: earth; 800: ground device; 810: processor; 820: main storage device; 830: auxiliary storage device; 840: input IF; 850: output IF; 860: communication IF; 870; signal line; 1000: flying object coping system

The invention claimed is:

1. A flying object coping system comprising:
a unified data library;
a surveillance satellite group formed of a plurality of surveillance satellites each including an infrared surveillance device to detect a launch of a flying object as launch detection information by using the infrared surveillance device and to track the flying object, the surveillance satellite group being configured to refer to the unified data library,
a surveillance ground facility to operate and control the surveillance satellite group, the surveillance ground facility being configured to refer to the unified data library,
a communication satellite group formed of a plurality of communication satellites to transfer flying object information acquired by the surveillance satellite group as satellite information, the communications satellite group being configured to refer to the unified data library, a communication ground facility to operate and control the communication satellite group, the communication ground facility being configured to refer to the unified data library,
a coping asset to cope with the flying object, the coping asset being configured to refer to the unified data library, and
a coping ground facility to operate and control the coping asset, the coping ground facility being configured to refer to the unified data library, wherein
the unified data library comprises a database having stored therein:
orbit information of the surveillance satellite group,
orbit information of the communication satellite group,
position information of the coping asset, and
a plurality of flying path models having flying paths modeled therein, the flying paths configured by using launch position coordinates, a flying direction, a time-series flying distance from a launch to an impact, and a flying altitude profile of the flying object.

2. The flying object coping system according to claim 1, wherein the unified data library includes:
a server to cause a search of the database and a display of extracted information, wherein the server includes processing circuitry to:
take the launch detection information of the flying object detected by the infrared surveillance device as a search condition and to extract, from among the plurality of flying path models stored in the database, a flying path model having the launch position coordinates conforming to the launch detection information;
take a launch detection time of the flying object detected by the infrared surveillance device as a starting point and to extract a correlation between a time in the extracted flying path model and position coordinates of the flying object as a flying profile;
extract, from the database, a surveillance satellite ID of each of the plurality of surveillance satellites flying at a position where the position coordinates of the flying object with a time transition in the flying profile can be surveyed, together with time information;
extract, from the database, a communication satellite ID of the communication satellite flying at a position where flying object information indicating information of the flying object to be detected by the surveillance satellite the surveillance satellite ID of which has been extracted can be transmitted and received, together with time information;
erase a nonconforming flying path model from among the plurality of flying path models based on the flying object information acquired by the subsequent surveillance satellite in accordance with the time transition; and
extract, from the database, a coping asset ID of the coping asset arranged near the position coordinates of the flying profile.

3. The flying object coping system according to claim 2, comprising:
a surveillance system having the surveillance satellite group formed of the plurality of surveillance satellites each including a surveillance device and a communication device;

a satellite information transfer system having the communication satellite group formed of the plurality of communication satellites each including a communication device; and a coping system including the coping asset, wherein the surveillance system transfers flying object information generated by surveying the flying object via the satellite information transfer system to the coping system, the flying object coping system has a satellite unified command center including a communication route search device to search for a communication route indicating a path of satellite information transferred by any of the surveillance satellites or any of the communication satellites, and the communication route search device refers to the unified data library and transmits a directive command to the surveillance satellites the surveillance system has and the communication satellites the satellite information transfer system has.

4. The flying object coping system according to claim 2, comprising:

a surveillance system having the surveillance satellite group formed of the plurality of surveillance satellites each including a surveillance device and a communication device;

a satellite information transfer system having the communication satellite group formed of the plurality of communication satellites each including a communication device; and a coping system including the coping asset, wherein the surveillance system transfers flying object information generated by surveying the flying object via the satellite information transfer system to the coping system, and the flying object coping system has a unified defense command center including a communication route search device to search for a communication route indicating a path of the satellite information transferred by any of the surveillance satellites or any of the communication satellites, a flying path prediction device to predict a flying path of the flying object, and a coping asset selection device to select a coping asset, and refers to the unified data library and transmits a directive command to the surveillance satellites the surveillance system has, the communication satellites the satellite information transfer system has, and the coping asset.

5. The flying object coping system according to claim 2, comprising:

a surveillance system including the surveillance satellite group formed of the plurality of surveillance satellites each including a surveillance device and a communication device, and a surveillance ground center to transmit a directive command to the surveillance satellite group;

a satellite information transfer system having the communication satellite group formed of the plurality of communication satellites each including a communication device; and a coping system including the coping asset, wherein the surveillance system transfers flying object information generated by surveying the flying object via the satellite information transfer system to the coping system, and the surveillance ground center includes a communication route search device to search for a communication route indicating a path of satellite information transferred by any of the surveillance satellites or any of the communication satellites and a flying path predication device to predict a flying path of the flying object, and refers to the unified data library and transmits a directive command to the communication satellites the satellite information transfer system has.

6. The flying object coping system according to claim 2, comprising:

a surveillance system including the surveillance satellite group formed of the plurality of surveillance satellites each including a surveillance device and a communication device, and a surveillance ground system to transmit a directive command to the surveillance satellite group;

a satellite information transfer system having the communication satellite group formed of the plurality of communication satellites each including a communication device, and a communication ground center to transmit a directive command to the communication satellite group; and a coping system including the coping asset, wherein the flying object coping system transfers flying object information generated by the surveillance system surveying the flying object via the satellite information transfer system to the coping system, the surveillance ground system refers to the unified data library, and transmits, to the communication ground center, a surveillance satellite ID, a time, and position information of the surveillance satellite which transmits the flying object information, a surveillance satellite ID, a time, and position information of the surveillance satellite on a reception side receiving the flying object information, or position information of the coping system, and the communication ground center includes a communication route search device to search for a communication route indicating a path of satellite information transferred by the communication satellite and, as a search result of the communication route searched for by the communication route search device, transmits a directive command to the communication satellite group the satellite information transfer system has.

7. The flying object coping system according to claim 2, comprising:

a surveillance system having the surveillance satellite group formed of the plurality of surveillance satellites each including a surveillance device and a communication device;

a satellite information transfer system having the communication satellite group formed of the plurality of communication satellites each including a communication device; and a coping system including the coping asset, wherein the surveillance system transfers flying object information generated by surveying the flying object via the satellite information transfer system to the coping system, the communication satellite group is operated and controlled by a plurality of communication satellite business device, and the surveillance system transfers, with reference to the unified data library, the flying object information acquired by the surveillance satellite via the plurality of communication satellite business devices to the coping system.

8. The flying object coping system according to claim 1, comprising:

a surveillance system having the surveillance satellite group formed of the plurality of surveillance satellites each including a surveillance device and a communication device;

a satellite information transfer system having the communication satellite group formed of the plurality of communication satellites each including a communication device; and a coping system including the coping asset, wherein the surveillance system transfers flying object information generated by surveying the flying object via the satellite information transfer system to the coping system, the flying object coping system has a satellite unified command center including a communication route search device to search for a communication route indicating a path of the satellite information transferred by any of the surveillance satellites or any of the communication satellites, and the communication route search device refers to the unified data library and transmits a directive command to the surveillance satellites the surveillance system has and the communication satellites the satellite information transfer system has.

9. The flying object coping system according to claim 1, comprising:

a surveillance system having the surveillance satellite group formed of the plurality of surveillance satellites each including a surveillance device and a communication device;

a satellite information transfer system having the communication satellite group formed of the plurality of communication satellites each including a communication device; and a coping system including the coping asset, wherein the surveillance system transfers flying object information generated by surveying the flying object via the satellite information transfer system to the coping system, and the flying object coping system has a unified defense command center including a communication route search device to search for a communication route indicating a path of the satellite information transferred by any of the surveillance satellites or any of the communication satellites, a flying path prediction device to predict a flying path of the flying object, and a coping asset selection device to select a coping asset, and refers to the unified data library and transmits a directive command to the surveillance satellites the surveillance system has, the communication satellites the satellite information transfer system has, and the coping asset.

10. The flying object coping system according to claim 1, comprising:

a surveillance system including the surveillance satellite group formed of the plurality of surveillance satellites each including a surveillance device and a communication device, and a surveillance ground center to transmit a directive command to the surveillance satellite group;

a satellite information transfer system having the communication satellite group formed of the plurality of communication satellites each including a communication device; and a coping system including the coping asset, wherein the surveillance system transfers flying object information generated by surveying the flying object via the satellite information transfer system to the coping system, and the surveillance ground center includes a communication route search device to search for a communication route indicating a path of satellite information transferred by any of the surveillance satellites or any of the communication satellites and a flying path predication device to predict a flying path of the flying object, and refers to the unified data library and transmits a directive command to the communication satellites the satellite information transfer system has.

11. The flying object coping system according to claim 1, comprising:

a surveillance system including the surveillance satellite group formed of the plurality of surveillance satellites each including a surveillance device and a communication device, and a surveillance ground system to transmit a directive command to the surveillance satellite group;

a satellite information transfer system having the communication satellite group formed of the plurality of communication satellites each including a communication device, and a communication ground center to transmit a directive command to the communication satellite group; and a coping system including the coping asset, wherein the flying object coping system transfers flying object information generated by the surveillance system surveying the flying object via the satellite information transfer system to the coping system, the surveillance ground system refers to the unified data library, and transmits, to the communication ground center, a surveillance satellite ID, a time, and position information of the surveillance satellite which transmits the flying object information, a surveillance satellite ID, a time, and position information of the surveillance satellite on a reception side receiving the flying object information, or position information of the coping system, and the communication ground center includes a communication route search device to search for a communication route indicating a path of satellite information transferred by the communication satellite and, as a search result of the communication route searched for by the communication route search device, transmits a directive command to the communication satellite group the satellite information transfer system has.

12. The flying object coping system according to claim 1, comprising:

a surveillance system having the surveillance satellite group formed of the plurality of surveillance satellites each including a surveillance device and a communication device;

a satellite information transfer system having the communication satellite group formed of the plurality of communication satellites each including a communication device; and a coping system including the coping asset, wherein the surveillance system transfers flying object information generated by surveying the flying object via the satellite information transfer system to the coping system, the communication satellite group is operated and controlled by a plurality of communication satellite business device, and the surveillance system transfers, with reference to the unified data, the flying object information acquired by the surveillance satellite via the plurality of communication satellite business devices to the coping system.

13. A flying path prediction method of analyzing, at a ground system, flying object surveillance information acquired by a satellite constellation configured of a plurality of surveillance satellites each including an infrared surveillance device and predicting a flying path of a flying object, the flying path prediction method comprising:

taking flying object launch detection information detected by the infrared surveillance device as a starting point;

analyzing an elapsed time after launch detection, a flying distance, and a flying altitude measured by the infrared surveillance device included in a subsequent machine, and excluding a nonconforming flying path model even in consideration of a measurement error from among the plurality of flying path models stored in the database included in a unified data library;

repeating an act of excluding a nonconforming flying path model based on measurement information of a next subsequent machine;

taking one or plurality of finally-remaining flying path models as provisional flying path prediction models; and based on measurement information of subsequent machines, correcting a deviation amount from the provisional flying path prediction models to predict a flying path to an impact of the flying object, wherein the unified data library includes:

a database having stored therein:

orbit information of the surveillance satellite group, orbit information of the communication satellite group, position information of the coping asset, and a plurality of flying path models having flying paths modeled therein, the flying paths configured by using launch position coordinates, a flying direction, a time-series flying distance from a launch to an impact, and a flying altitude profile of the flying object.

14. A communication route search method of searching for, at a ground system, a shortest communication route among communication routes of a communication satellite group, in a flying object coping system to transfer flying object surveillance information acquired by a surveillance satellite constellation configured of a plurality of surveillance satellites each including an infrared surveillance device, to another surveillance satellite and a coping asset by taking, as a transfer path, a communication satellite constellation in which a plurality of communication satellites fly on a plurality of orbital planes and the communication satellites crosslink with each other to form a communication network, and to cope with a flying object by the coping asset before an impact of the flying object, wherein the ground system includes a communication route search device to analyze communication satellite IDs configuring a communication path for transferring flying object information from a surveillance satellite to another surveillance satellite in a shortest route, a sequence of communication satellite IDs via which passage is made in a time-series manner, and times when communication satellites communicate with each other, refers to a unified data library, takes flying object launch detection information detected by the infrared surveillance device as a starting point, selects a subsequent surveillance satellite which can survey a flying path at a predicted time from among a plurality of flying path models, and conducts a search for a shortest route for transferring information from a launch-detecting surveillance satellite to a subsequent surveillance satellite, based on flying object information detected by a further subsequent surveillance satellite, selects a next subsequent surveillance satellite which can survey a flying path at a predicted time by using a flying path model as a candidate and conducts a search for a shortest route for transferring information from the subsequent surveillance satellite to the next subsequent surveillance satellite, and after repeating, based on a result of a flying path prediction separately conducted by the ground system, a search for a shortest route for transferring information to a surveillance satellite which can survey with regard to a flying path and a passage time, searches for a shortest route for transferring information to a coping asset capable of coping, wherein the unified data library includes;

a database having stored therein:

orbit information of the surveillance satellite group, orbit information of the communication satellite group, position information of the coping asset, and a plurality of flying path models having flying paths modeled therein, the flying paths configured by using launch position coordinates, a flying direction, a time-series flying distance from a launch to an impact, and a flying altitude profile of the flying object.

* * * * *